March 4, 1947.  C. S. EVANS  2,416,915
SINGLE LEG SUPPORT FOR WELDING GUNS
Filed July 6, 1945
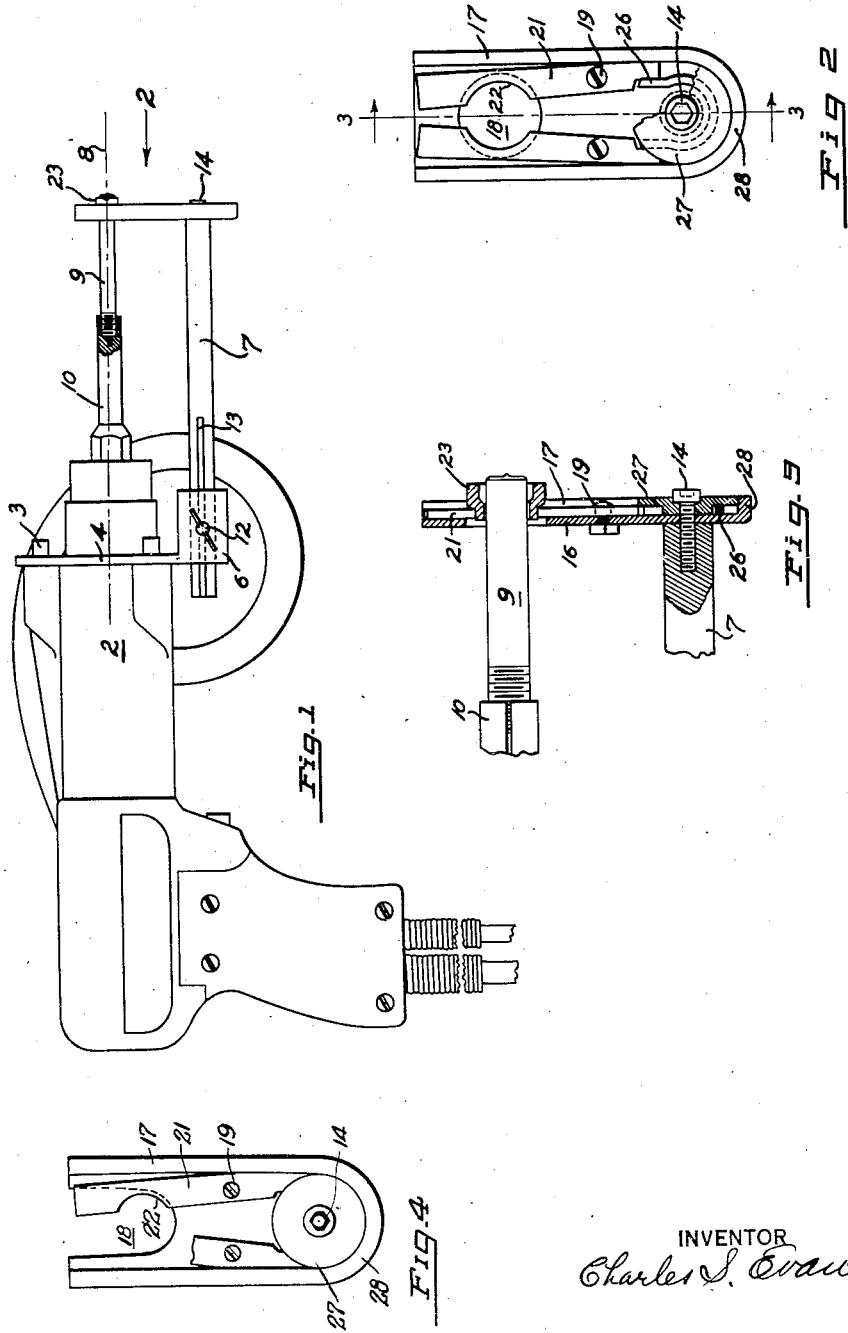
INVENTOR
Charles S. Evans Patented Mar. 4, 1947

2,416,915

UNITED STATES PATENT OFFICE 2,416,915

SINGLE LEG SUPPORT FOR WELDING GUNS

Charles S. Evans, Atherton, Calif., assignor to Ted Nelson, San Leandro, Calif.

Application July 6, 1945, Serial No. 603,515

9 Claims. (Cl. 219—4)

The invention relates to the art of arc welding studs; and the principal object of the invention is to provide a single leg support for the welding gun and at the same time means for holding a ferrule around the site of the weld. Another object of the invention is the provision of means for supporting the gun which leaves the stud chuck more readily accessible. Still another object of the invention as the title suggests, is a support for the gun which facilitates the use of the gun in restricted places where there is little space other than that in which the stud is to be welded, or to facilitate the use of the gun in welding studs to curved surfaces such as the outside of pipes or cylindrical bodies.

My invention possesses other objects and features of value, some of which with the foregoing will be set forth in the following description of the invention. It is to be understood that I do not limit myself to the showing made by the said description and the drawings as I may adopt variant forms of the invention within the scope of the appended claims.

Referring to the drawings:

Figure 1 is a side elevation on a reduced scale of a stud welding gun embodying my single leg support. Figure 2 is a front elevation of the foot of my one-leg support. The figure is substantially full size and is taken from the direction indicated by the arrow 2 of Figure 1. Figure 3 is a vertical sectional view taken in the plane indicated by the line 3—3 of Figure 3 and showing the foot end of my support and a stud and ferrule in place. The end of the stud chuck is also included in this view. Figure 4 is a view similar to Figure 2 showing a modified form of the structure, a portion of one of the jaws being broken away.

When studs are arc welded to a supporting structure such as a plate, it has been customary to hold the stud in the chuck of a welding gun, adjusting the legs of the gun so that the stud projects a small amount beyond the plane of the leg ends. The stud can then be centered on the exact spot where it is to be welded, and when the gun is pressed to seat the legs, the stud and chuck are pushed back against the resistance of a spring which insures that the stud shall maintain a good electrical contact with the plate.

When the trigger switch of the gun is pressed to close the welding circuit through the stud, it is lifted from the plate to draw an arc and after a timed interval during which the stud and adjacent area of the plate reach a welding temperature, the circuit is broken, and the stud is thrust against the plate, the metal coalescing to form the weld. It is of very great advantage for a number of reasons to surround the welding end of the stud at the moment of welding with a refractory sleeve or ferrule. The ferrule, surrounding the weld site, confines and shields the arc, prevents sputter, and may be made to act, in part at least, as a mold. It has been the practice to hold the ferrule about the stud in the end of a coil spring surrounding the stud and adjustable on the stud chuck as is shown in the patent to Nelson No. 2,355,099, dated August 8, 1944.

In general this represents a big advance over previously used methods and means, but different studs require different springs, which requires the operator to have a variety of springs available and to change the spring if the stud length is changed. The same is true of a change in the diameter of the stud. Altogether, the spring means for holding the ferrule has been something of a nuisance, and the need for a new holding means for the ferrule has long been apparent.

I have met this problem by adjustably mounting in a bracket fixed on the body of the gun, and wholly to one side of the longitudinal axis of the gun (which is also the longitudinal axis of the stud chuck and stud), a single rod, constituting a leg, and ending in a foot extending toward the axis. The foot is provided with spring pressed jaws for holding a ferrule concentric with the axis and surrounding the end of the stud. The arrangement of ferrule-holding jaws and foot is such that the entire weight of the gun, if used in a vertical position, or the entire pressure against the wall exerted by the operator, if the gun is used in a horizontal position, is carried on the ferrule which in turn is supported by the jaws, foot, leg and gun body.

Because of this construction, both stud and ferrule are clearly in view of the operator, the foot and jaws hiding only a small part of the ferrule. This of course greatly facilitates the positioning of the studs contributing heavily to accurate and rapid operation. Another advantage of the open construction contributing to speed and convenience is the ease with which studs are placed in the chuck, and the chuck itself changed to adapt the gun for use with studs of different diameter or shape.

I have shown my invention incorporated into a stud welding gun of the sort shown and described in the copending application of Ted Nelson, Serial No. 528,196, filed March 27, 1944, now Patent No. 2,413,189, dated December 24, 1946.

Fixed securely on the gun body 2 by the screws 3 is an annular plate 4, having on one side thereof a sleeve head 6. In the bracket so formed is slidably mounted a rod 7, constituting a single leg for the gun. The rod lies substantially parallel to the gun axis 8, and well to one side thereof, and of the stud 9 and stud chuck 10. Rotation of the rod 7 in the supporting bracket head 6 is prevented while longitudinal adjustment of the rod is permitted by the engagement of the end of the thumb screw 12 in the groove 13. Tightening the screw fixes the rod against movement relative to the gun body.

Fixed on the end of the rod by the screw 14 is a foot, constituting the ferrule chuck assembly. The foot comprises an elongated plate 16 having a stiffening flange 17 bordering the two sides and one rounded end. The free end of the plate is formed with an aperture 18, concentric with the gun axis, or if preferred the end may be left open to provide a similar free space, as shown in Figure 4.

Pivotally mounted on the foot plate, one on each side of the aperture 18, by means of screws 19, are two flat jaws 21, each with a curved notch 22, so shaped and positioned that the jaws are conditioned to hold a ferrule 23 concentric with the axis 8. The jaws are spring pressed firmly against the ferrule by the U-shaped spring 26. As shown best in Figure 3, pressure on the ferrule, toward the gun presses the shoulder of the ferrule against the jaws 21, which lie flat against the plate 16 of the foot, so that such pressure is carried through the jaws and foot by the leg 7. This is only another way of saying that in any position of the gun, its weight, or the pressure applied by the operator is ultimately supported on the ferrule, which of course rests against the body to which the stud is to be welded.

The Allen head screw 14 which fixes the plate 16 on the end of the rod 7, also secures the hubbed washer 27 in the curve 28 of the flange over the spring 26, leaving the spring free to function in the space between the plate and the rim of the washer. Preferably the head of the screw is seated in a shallow depression of the washer as shown in Figure 3.

From an inspection of Figure 1, it will be observed that when a stud 9 is held in the stud chuck 10, the ferrule chuck jaws 21 hold the ferrule so that the end of the stud extends about ⅜″ beyond the ferrule. This permits the operator a clear view of the stud end, so that it is readily placed on the mark indicating the location of the stud. Pressing the gun forward then seats the ferrule, the stud and its chuck being pressed back against the resistance of a spring forming part of the gun mechanism. If the ferrule is evenly seated, the stud will be perpendicular to the flat surface to which it is to be welded; and handling the gun to evenly seat the ferrule is quickly learned. Because of the open construction and ample space about the parts, seating the studs and ferrules in their respective chucks, or removing them therefrom, is easily and rapidly accomplished.

I claim:

1. In a gun for welding a stud within an enclosing ferrule, a chuck for carrying the stud, a chuck for carrying the ferrule, and a support for the ferrule chuck mounted on the gun and positioned entirely to one side of the stud chuck.

2. In a gun for welding a stud within an enclosing ferrule, a chuck for carrying the stud in axial alignment therewith, a chuck for carrying the ferrule and extending transversely of the stud chuck axis, and means positioned entirely to one side of the stud chuck axis for supporting the ferrule chuck on the gun.

3. In a gun for welding a stud within an enclosing ferrule, a chuck for carrying the stud in axial alignment therewith, a chuck for carrying the ferrule and extending transversely of the stud chuck axis, and a single leg on the gun lying wholly to one side of the stud chuck and on the outer end of which the ferrule chuck is mounted.

4. In a gun for welding a stud within an enclosing ferrule, a chuck for carrying the stud in axial alignment therewith, a chuck for carrying the ferrule and extending transversely of the stud chuck axis, a bracket fixed on the side of the gun, a single leg slidably mounted in the bracket and lying wholly to one side of the stud chuck and on the outer end of which the ferrule chuck is mounted, and means for fixing the leg in the bracket.

5. In a gun for welding a stud within an enclosing ferrule, a chuck for carrying the stud, a single leg on the gun lying wholly to one side of the stud chuck, a plate forming a foot on the leg and extending across the chuck axis, and a pair of spring-pressed jaws mounted on the plate to hold the ferrule.

6. In a gun for welding a stud within an enclosing ferrule, a chuck for carrying the stud, a single leg on the gun lying wholly to one side of the stud chuck, a plate forming a foot on the leg and extending across the chuck axis, a pair of notched jaws pivotally mounted on the plate to hold the ferrule in the notches and spring means for pressing the jaws upon the ferrule.

7. In a gun for welding a stud within an enclosing ferrule, a chuck for holding the stud, a leg extending from the gun and lying to one side of the stud chuck, a foot on the leg extending toward the axis of the chuck, and means on the foot for holding the ferrule.

8. In a gun for welding a stud within an enclosing ferrule, a chuck for holding the stud, a leg extending from the gun and lying to one side of the stud chuck, a foot plate on the leg extending toward the axis of the chuck, and spring pressed jaws pivotally mounted on the foot plate and having aligned notches therein to hold the ferrule concentric with the stud axis.

9. In a gun for welding a stud within an enclosing ferrule, a chuck for holding the stud, a rod constituting a single leg extending from the gun and lying to one side of the stud axis, and a ferrule chuck arranged on the rod.

CHARLES S. EVANS.

REFERENCES CITED

The following references are of record in the file of this patent:

UNITED STATES PATENTS

| Number | Name | Date |
| --- | --- | --- |
| Re. 22,317 | Nelson | May 18, 1945 |
| 2,315,502 | Crecca et al. | Apr. 6, 1945 |